US011582611B1

(12) United States Patent
Kwong et al.

(10) Patent No.: US 11,582,611 B1
(45) Date of Patent: Feb. 14, 2023

(54) PROMPT AND SECURE DATA COMMUNICATION PAIRING

(71) Applicant: Amazon Technologies, Inc., Seattle, WA (US)

(72) Inventors: Andrew W. Kwong, Bellevue, WA (US); Serghei Bondari, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 17/113,719

(22) Filed: Dec. 7, 2020

(51) Int. Cl.
*H04B 7/00* (2006.01)
*H04W 12/50* (2021.01)
*H04W 76/14* (2018.01)
*H04W 76/11* (2018.01)
*H04W 12/069* (2021.01)
*H04W 4/80* (2018.01)
*H04W 4/02* (2018.01)
*H04B 17/318* (2015.01)
*H04W 80/10* (2009.01)
*H04L 5/00* (2006.01)

(52) U.S. Cl.
CPC .......... *H04W 12/50* (2021.01); *H04B 17/318* (2015.01); *H04W 4/023* (2013.01); *H04W 4/80* (2018.02); *H04W 12/069* (2021.01); *H04W 76/11* (2018.02); *H04W 76/14* (2018.02); *H04W 80/10* (2013.01); *H04L 5/0055* (2013.01)

(58) Field of Classification Search
CPC ....... H04W 12/50; H04W 76/14; H04W 4/80; H04W 76/11; H04W 12/069; H04W 4/023; H04W 80/10; H04B 17/318; H04L 5/0055
USPC ........................................................ 455/41.2
See application file for complete search history.

(56) References Cited

U.S. PATENT DOCUMENTS

| | | | | |
|---|---|---|---|---|
| 9,794,753 | B1* | 10/2017 | Stitt | G06F 21/35 |
| 11,019,195 | B2* | 5/2021 | Ledvina | H04W 4/023 |
| 2017/0303080 | A1* | 10/2017 | Stitt | H04L 9/3226 |
| 2017/0303090 | A1* | 10/2017 | Stitt | H04L 9/3226 |
| 2018/0146706 | A1* | 5/2018 | Bochuliak | A24F 1/26 |
| 2019/0236600 | A1* | 8/2019 | Glendenning | G06Q 20/327 |
| 2020/0106877 | A1* | 4/2020 | Ledvina | H04W 12/06 |
| 2020/0228919 | A1* | 7/2020 | Stitt | H04W 4/80 |

(Continued)

*Primary Examiner* — April G Gonzales
(74) *Attorney, Agent, or Firm* — Thomas | Horstemeyer, LLP

(57) ABSTRACT

Prompt and secure data communication paring concepts are described. In one example, a method for data communications includes a client device receiving an advertising packet from a peripheral device, comparing a signal strength indicator for the advertising packet to a threshold, generating a session key based on the comparing, and transmitting the session key to the peripheral device. The method also includes communicating and acknowledging one or more data chunks between the devices through a secure communications channel. The concepts are different that traditional pairing techniques for short-range, low-power wireless data communications in that secure communications channels can be achieved automatically, relatively more quickly, and repeatedly without the need for user intervention. The secure communications channels can be established and reestablished without the need for traditional pairing techniques.

21 Claims, 7 Drawing Sheets

(56) References Cited

U.S. PATENT DOCUMENTS

2021/0006652 A1\* 1/2021 Ledvina ............ H04M 1/72457
2022/0182849 A1\* 6/2022 Volkerink .............. G16Y 30/00
2022/0201435 A1\* 6/2022 Volkerink ............. H04W 4/029

\* cited by examiner

US 11,582,611 B1

PROMPT AND SECURE DATA COMMUNICATION PAIRING

BACKGROUND

Establishing a communications channel between two computing devices in a short-range, low-power wireless network is sometimes called "pairing" the devices. In some cases, one device acts as a master, controller, or main device and one or more other devices act as slave, client, or worker devices, but other network topologies are possible. The channels in these networks are typically maintained until they are broken, either by deliberately disconnecting the devices or because the devices become physically separated from each other and the radio link fails. Pairing processes can proceed in a number of different ways depending on various factors, including the types of devices establishing communications, the version or revision of the application, transport, and physical network layers of the devices, and control of the devices by users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
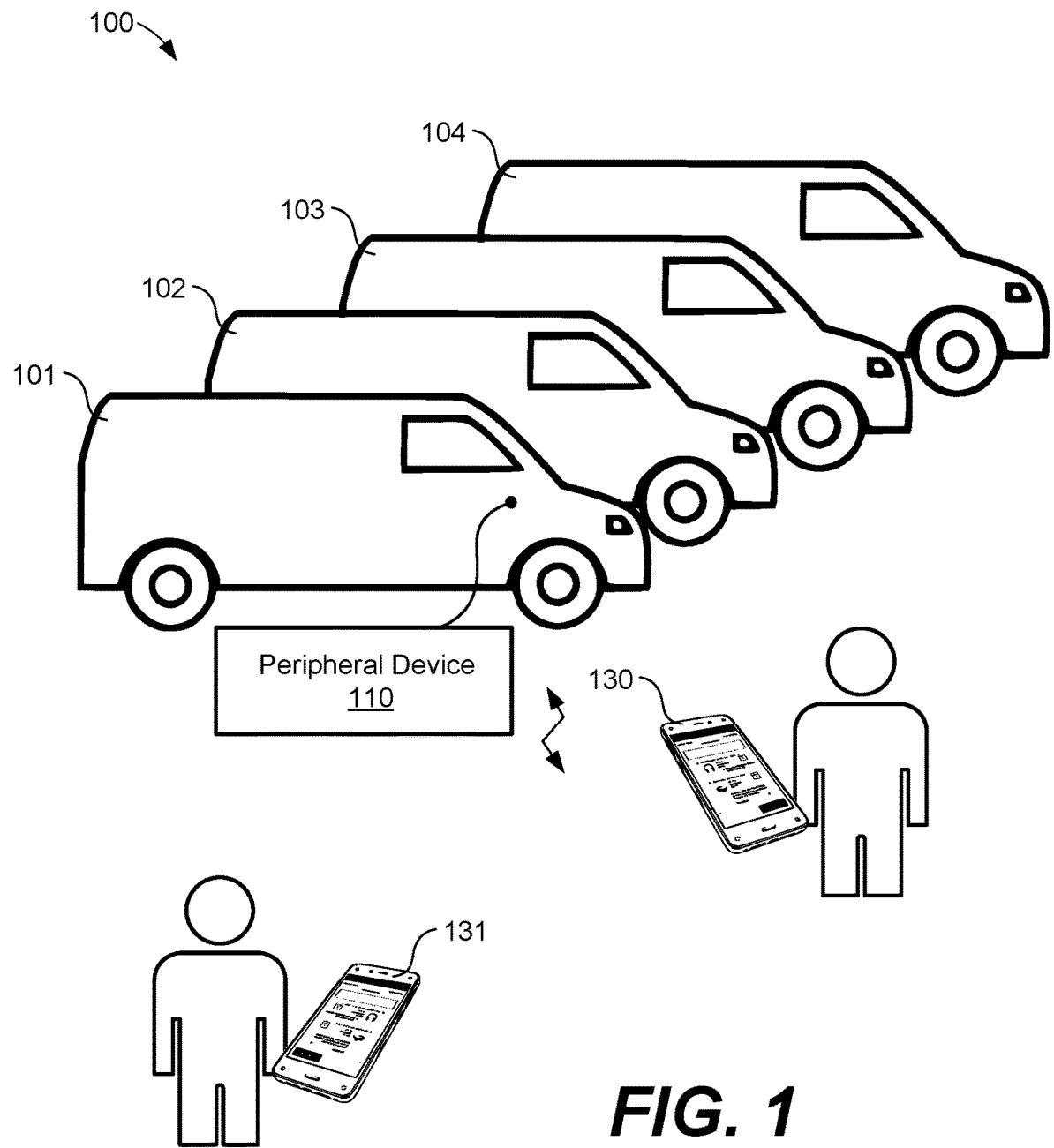
FIG. 1 illustrates an environment for data communication pairing according to examples described herein.

New automotive head units, also known as stereo receivers, in-dash stereos, automobile decks, and by other terms, can provide a unified infotainment interface in vehicles. Head units are typically central to the information and audio systems of vehicles. Head units are commonly located prominently in the center of the dashboard or console of a vehicle, and provide an integrated interface for the information and entertainment media components of the vehicle. Head units often include one or more screens, buttons, and other system controls as a user interface for the information and entertainment media components of the vehicle. Many head units can establish wireless communications channels with other devices and networks, though cellular, WiFi®, Bluetooth®, Bluetooth® low energy (BLE), or other network interfaces. Such head units can communicate data with cellular networks, cellular phones, laptop computers, tablet devices, and other devices for wireless data communications between them.

As noted above, establishing a communications channel between two computing devices in a short-range wireless network is sometimes called "paring" the devices. Pairing processes can proceed in a number of different ways depending on various factors. An example pairing process can be triggered the first time one device receives a connection request from another device with which it is not yet paired. A new device can be placed into discoverable mode, which allows other devices in the vicinity to detect the presence of the new device and attempt to establish a connection with it. For some devices with a limited number of interface elements for control, such as headphones, it may be necessary to press and hold a button, for example, to put the device into pairing or discovery mode. Devices such as cellular phones and laptops, on the other hand, can constantly look for devices with which to pair. Devices can exchange certain device information as part of the discovery process, such as device types, device names, and other information. The devices can also exchange a password or passkey in some cases to establish a connection between them.

Pairing and other connection processes for short-range, low-power wireless data communications can be cumbersome and problematic in some scenarios, including between cellular phones and the head units in vehicles. The head unit or infotainment system in a privately-owned vehicle or automobile, for example, may be paired with a limited number of different cellular phones over several years. In that case, the pairing process can be completed with the head unit once for each phone with some user intervention, and it is typically not necessary for repeated user intervention over time.

Pairing and data communication between a cellular phone and the head unit in a vehicle can offer a number of benefits, such as better access to navigation and route information, notifications, telephone calls, and other features. These features permit drivers to operate vehicles more safely and with less distractions, offload processing tasks from battery-operated phones to in-vehicle head units, and provide other benefits.

Many industry-standard pairing or connection processes face challenges in certain use cases, however. For context, FIG. 1 illustrates an environment 100 for data communication pairing according to certain examples. The environment 100 includes a fleet of vehicles, including the vehicles 101-104, among possibly others, and a number of client devices 130 and 131, among possibly others. The vehicle 101 includes a peripheral device 110, which can be embodied as an in-vehicle infotainment or information head unit, as described in further detail below. Each of the vehicles 102-104 includes a similar head unit. The vehicles 101-104 are shown as delivery vans in FIG. 1, although the concepts described herein are not limited to use with any particular type of vehicle or head unit. The client devices 130 and 131 are shown as cellular phones, but the concepts are not limited to use with any particular type of client device, as drivers may carry tablet computers, laptops, or other client devices.

A number of different drivers can each be assigned to operate a different one of the vehicles 101-104 to deliver packages, for example, or perform other tasks each day. The drivers can each carry a client device, such as the client devices 130 and 131, which can be relied upon to provide instructions for and confirm the deliveries and other tasks. For various reasons, the drivers may want to establish data communications between the peripheral devices in the vehicles 101-104 and the client devices 130 and 131. It would be time consuming and frustrating, however, if it were necessary for the drivers to clear prior device pairings from the peripheral devices in the vehicles 101-104, place the client devices 130 and 131 into discoverable mode, and monitor and troubleshoot the pairings of the client devices 130 and 131 with the vehicles 101-104 each day.

The problems with pairing devices in the environment 100 can also be negatively influenced when the drivers attempt to pair the client devices 130 and 131 with certain vehicles 101-104 within relative proximity to each other (and if more client devices and vehicles are also concurrently attempting to pair), such as in a parking lot where the fleet of vehicles 101-104 is stationed. The drivers can also have problems during the workday. For example, if a driver stops and exits a vehicle frequently along a route for delivery, it may be necessary for client devices to re-pair each time the driver gets back into the vehicle. Even a relatively short delay in re-establishing data communication can be problematic for drivers in this scenario.

In the context outlined above, the embodiments described herein are directed to new computing devices and methods for prompt and secure data communication pairing between devices. The concepts described herein are different that traditional pairing techniques for short-range, low-power wireless data communications in that secure communications channels between devices can be achieved automatically, relatively more quickly, and repeatedly without the need for user intervention. The secure communications channels can be established without the need for traditional pairing techniques.

According to aspects of the embodiments, the peripheral device 110 in the vehicle 101 can broadcast advertising packets for establishing a data communications channel with any of the client devices 130 and 131, among others. In one example, the advertising packets can be BLE advertising packets for BLE wireless data communications, but the packets can establish other types of wireless connections. The peripheral devices in the other vehicles 102-104 can also broadcast similar advertising packets. The advertising packets can include unique identifiers (UIDs) of the vehicles 101-104.

The client devices 130 and 131 can receive one or more of the advertising packets from the vehicles 101-104, along with an indicator of received signal strength for each. The signal strength indicators are indicative of the relative distance between the client devices 130 and 131 and the vehicles 101-104. As the client device 130 approaches the vehicle 101, for example, the signal strength indicator for the advertising packet from the peripheral device 110 will increase or otherwise identify increased signal strength. Thus, the signal strength indicator for each advertising packet received from the vehicles 101-104 can be relied upon as a measure of the relative distance between the client device 130 and the vehicles 101-104.

As the client device 130 is carried (and relocated) by a driver among the vehicles 101-104, the client device 130 can compare the signal strength indicator for each advertising packet received from the vehicles 101-104 against a threshold, as a test or measure of proximity between the client device 130 and the vehicles 101-104. When the client device 130 identifies a signal strength indicator at or above the threshold for an advertising packet received from the vehicle 101, for example, the client device 130 can transmit a scan request to the peripheral device 110. The threshold can be set to transmit the scan request when a driver carrying the client device 130 is seated in the vehicle 101, or at some other set distance or proximity. The peripheral device 110 can then reply to the client device 130 with a scan response. The scan response can include a certificate used to establish a secure communications channel between the client device 130 and the peripheral device 110. Other steps in the process are described in additional detail below.

The procedure for promptly and securely establishing communications between the client device 130 and the peripheral device 110 can proceed without intervention from the driver carrying the client device 130. Further, once communications is established initially, the client device 130 and the peripheral device 110 can maintain an affinity for communications between each other for faster pairings during at least a certain window of time. Thus, even if the driver exits the vehicle 101 and the short-range wireless connection is lost with the client device 130, the secure connection can be reestablished very quickly. The secure connection can also be reestablished quickly at a further distance than the initial pairing, to facilitate less delay in the transfer of data.

In other aspects of the embodiments, relatively large amounts of data can be communicated in chunks over the secure communications channel, using BLE wireless data communications or other protocols. Each data chunk can be communicated and acknowledged between the client device 130 and the peripheral device 110, respectively, before another data chunk is communicated. The protocol facilitates two-way communication of relatively large amounts of data between the client device 130 and the peripheral device 110.

Data transferred from the client device 130 to the peripheral device 110 can be used to display navigation and route information, notifications, and other business-related information on a display of the peripheral device 110 for the driver of the vehicle 101. These features permit the driver of the vehicle 101 to operate more safely and with less distractions, offload processing tasks from the client device 130 (e.g., to save battery life of the client device 130), and provide other features and benefits. Data can also be transferred from the peripheral device 110 to the client device 130. This data can be stored on the client device 130 and, in some cases, relayed to other computing environments for other business purposes. For example, vehicle telemetry data can be relayed from the client device 130 to the computing environment of a business entity for aggregation and analysis. These and other aspects of the embodiments are described in further detail below.

Figure 2:
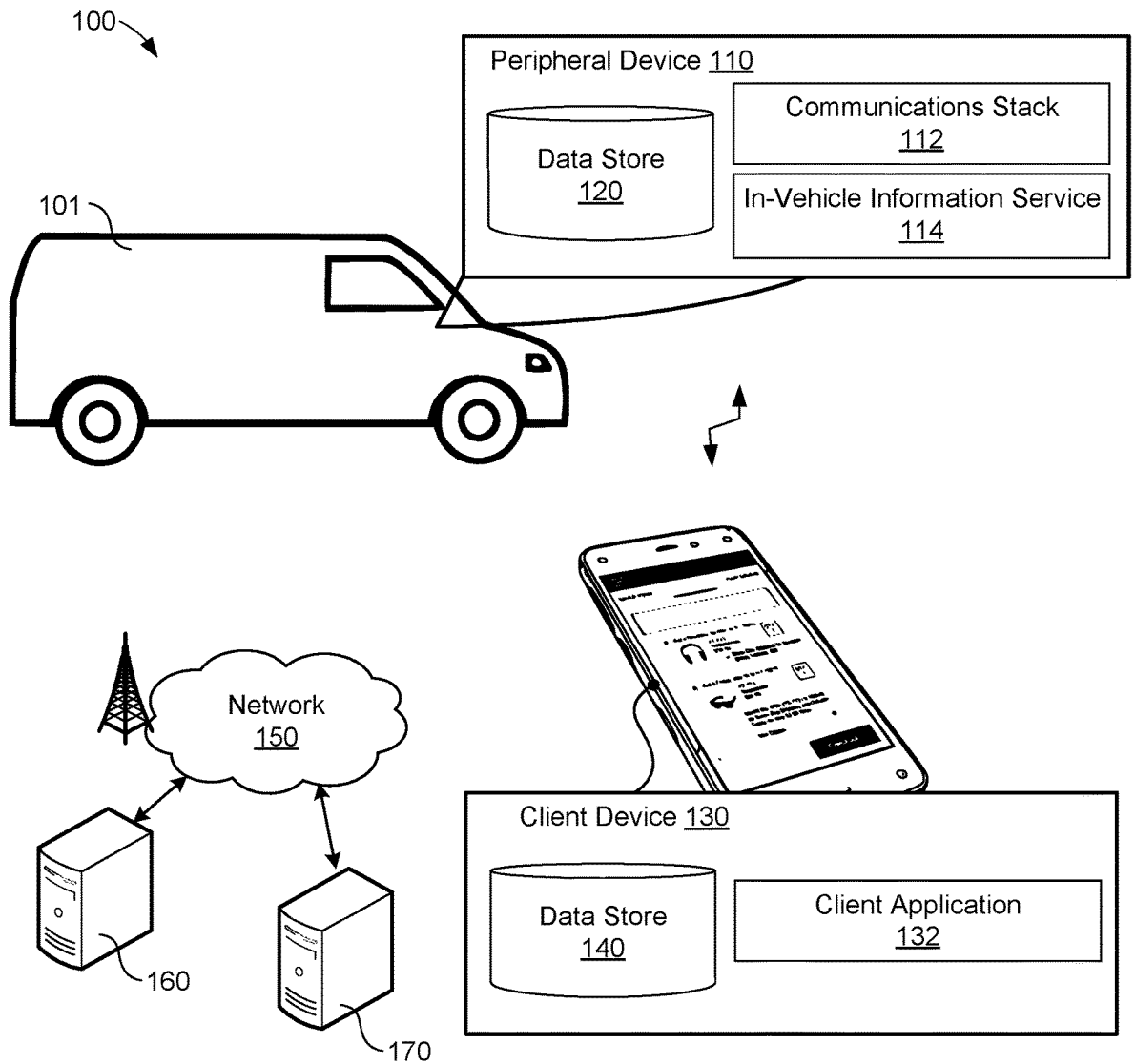
FIG. 2 illustrates a networked environment for prompt and secure data communication pairing according to example embodiments described herein.

FIG. 2 further illustrates the environment 100 for prompt and secure data communications pairing according to various example embodiments described herein. Among other components, the environment 100 includes the vehicle 101 with the peripheral device 110, the client device 130, a network 150, a certificate authority 160, and a computing environment 170. The environment 100 is illustrated as a representative example in FIG. 2. The concepts of prompt and secure data communication pairing described herein can be performed in other environments and with other computing devices. For example, the client device 130 is illustrated as a cellular phone, although the client device 130 can be embodied as other types of computing devices as described below. The environment 100 is also not an exhaustive illustration, as components may be omitted from view for simplicity. Additionally, one or more components shown in FIG. 2, such as the certificate authority 160, may be optional and can be omitted in some cases depending on the configuration of the security infrastructure.

As noted above, the peripheral device 110 can be embodied as an automotive head unit. The peripheral device 110 includes a communications stack 112, an in-vehicle information service (IVIS) 114, and a data store 120 among other components. The peripheral device 110 can be central to the information and audio systems of the vehicle 101, and a display interface for the peripheral device 110 can be located prominently in the center of the dashboard or console of the vehicle 101. The peripheral device 110 can provide an integrated interface for the information and systems control components of the vehicle 101.

The peripheral device 110 can include one or more computing or processing devices with memory, capable of executing a number of applications for the vehicle 102. In that sense, the peripheral device 110 can also be embodied, in part, as functional logic elements (e.g., executed computer-readable instructions, logic circuitry, processing circuitry, etc.) executed or operated by the peripheral device 110 to direct it to perform aspects of the embodiments described herein.

The peripheral device 110 can also include one or more displays, touch screens, buttons, and other system controls as a user interface. The user interface can be accessed through a touch screen of the peripheral device 110, on the dash and center console of the vehicle 101, on the steering wheel of the vehicle 101, and at other locations. The peripheral device 110 can include or be integrated with various computing or processing devices and systems, vehicles status and control systems, in-vehicle network interfaces, speakers, microphones, AM/FM radios, satellite radios, digital video disc (DVD) and compact disc (CD) players, media players, cameras, and global positioning system (GPS) navigation systems.

The peripheral device 110 can be communicatively coupled with other in-vehicle devices and systems through one or more in-vehicle network interfaces, such as the on-board diagnostics (OBD) bus, the controller area network (CAN) bus, the local interconnect network (LIN) bus, the media oriented systems transport (MOST) bus, ethernet, or other network interfaces using any suitable protocols. Using these interfaces, the peripheral device 110 can be exposed to and access status, control, and telemetry data for the vehicle 101.

The data store 120 of the peripheral device 110 can include any suitable type of memory or memory device to store data for the peripheral device 110, such as one or more unique identifiers for the peripheral device 110, digital certificates, encryption keys, session keys and session parameters for communications, and other data for reference and processing. The data store 120 can also store computer-readable instructions for execution by the peripheral device 110, including instructions for the communication stack 112 and the IVIS 114.

The communications stack 112 can include software and hardware layers to implement data communications, such as Bluetooth®, BLE, WiFi®, and cellular data communications interfaces. Thus, the communications stack 112 can be relied upon by the peripheral device 110 to establish cellular, Bluetooth®, WiFi®, and other communications channels with the network 150 and the client device 130.

The communications stack 112 can include the software and hardware to implement Bluetooth®, BLE, and related networking interfaces, which provide for a variety of different network configurations and flexible networking protocols for short-range, low-power wireless communications. The communications stack 112 can also include the software and hardware to implement WiFi® communication, which also offers a variety of different network configurations and flexible networking protocols for wireless communications. The communications stack 112 can also incorporate the software and hardware to implement other communications interfaces, such as X10®, ZigBee®, Z-Wave®, and others. The communications stack 112 is configured to perform prompt and secure data communication pairing with the client device 130 as described in further detail below.

The IVIS 114 can be embodied as one or more software applications or services executing on the peripheral device 110. The IVIS 114 can present user interfaces on a display of the peripheral device 110 based on data received from in-vehicle network interfaces, the data store 120, and the communications stack 112. As examples, the IVIS 114 can process data received from vehicle sensors, (e.g., from seatbelt sensors, speed sensors, location data, camera data, radar data, etc.), from GPS navigation systems, from cellular communications over the network 150, and from other sources. The IVIS 114 also has access to data received from the client device 130 through the communications stack 112. As examples, the data from the client device 130 can include delivery address data, package data, itinerary data, schedule data, next-destination route data, and other data related to tasks being undertaken by the driver of the vehicle 101.

The IVIS 114 can offload tasks from the client device 130 by processing data received from the client device 130. By running processes on the IVIS 114, such as navigation applications, the IVIS 114 can help to reduce battery drain on the client device 130. The IVIS 114 also provides a more convenient interface for the driver of the vehicle 101 than the display screen of the client device 130, particular when operating the vehicle 101.

The prompt and secure data communications pairing techniques described herein facilitate two-way data communications, and the IVIS 114 can also communicate data to the client device 130. As one example, the IVIS 114 can communicate vehicle sensor data (e.g., from seatbelt sensors, speed sensors, location data, camera data, radar data, etc.), vehicle telemetry data (e.g., speed, direction, and other data), and other data to the client device 130. This data can be used on the client device 130 for safety management, incident recording, collision detection, and other purposes.

The client device 130 can be embodied as any computing device, processing circuit, or processor based device or system with memory, including those embodied in the form of a cellular phone, personal digital assistant, wearable computing device, tablet computer, laptop computer, or other computing device or system. The client device 130 can include one or more subsystems and/or peripheral devices. For example, the peripheral devices may include one or more input devices, such as keyboards, keypads, touch pads, touch screens, microphones, cameras, buttons, etc. The peripheral devices can also include network interfaces, displays, indicator lights, speakers, GPS systems, accelerometers, and other components. The network interfaces of the client device 130 can include cellular, WiFi®, Bluetooth®, BLE, X10®, ZigBee®, Z-Wave®, and other network interfaces for wireless data communications. The client device 130 can communicate data over the network 150 and data with the peripheral device 110 using the network interfaces.

The data store 140 of the client device 130 can include any suitable type of memory or memory device to store data for the client device 130, such as one or more unique identifiers for the client device 130, digital certificates, encryption keys, session keys and session parameters for communications, and other data for reference and processing. The data store 140 can also store computer-readable instructions for execution by the peripheral device 110, including instructions for executing various applications.

The client device 130 can execute various applications, such as the client application 132. In one embodiment, the client application 132 can be embodied as a browser application that receives and renders network pages served by the computing environment 170 via the network 150. As one example, the client application 132 can be embodied as a hypertext-based internet browser or other type of browser, without limitation. Alternatively, the client application 132 may be embodied as a dedicated application for one or more tasks, such as directing the delivery of packages along a route, that interacts with the computing environment 170 using a suitable protocol via the network 150. The client application 132 can include a middleware library for establishing data communications with the IVIS 114 on the peripheral device 110, allowing access to in-vehicle data on the in-vehicle message bus of the vehicle 101 without hardware dependency. The client application 132 can require a user of the client device 130 to enter access credentials, such as a username and password, biometric credentials, or other credentials, before permitting access to the features and functions of the client application 132. Actions and processes performed by the client application 132 are described in further detail below.

The network 150 can include the Internet, intranets, extranets, wide area networks (WANs), local area networks (LANs), wired networks, wireless networks (e.g., cellular, WiFi®, etc.), cable networks, satellite networks, other suitable networks, or any combinations thereof. The certificate authority 160, the computing environment 170, and other computing systems can communicate with the client device 130 using any suitable systems interconnect models and/or protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. Although not illustrated, the network 150 can include connections to any number of other network hosts, such as website servers, file servers, networked computing resources, databases, data stores, or any other network or computing architectures.

The certificate authority 160 can be embodied as one or more computers, computing devices, or computing systems directed to operate as a certificate authority for the peripheral device 110, the client device 130, the computing environment 170, and other computing devices on the network 150. In that context, the certificate authority 160 is configured to issue, validate, and verify identity certificates, digital certificates, and other certificates that can be relied upon to authenticate the identity of one or more devices in the environment 100. An identity or digital certificate can be relied upon to certify or authenticate the ownership of a public key. In that sense, the certificate authority 160 can operate as a trusted third party between the peripheral device 110, the client device 130, and the computing environment 170.

In some cases, however, the peripheral device 110 and the client device 130 can exchange certificates and rely upon a chain of trust among the certificates to establish trust among each other. It may be optional and in some cases unnecessary to communicate with the certificate authority 160 to establish a secure communications channel between the peripheral device 110 and the client device 130 in that case.

The computing environment 170 can be embodied as one or more computers, computing devices, or computing systems of an electronic commerce platform. In certain embodiments, the computing environment 170 can include one or more computing devices arranged, for example, in one or more server or computer banks. The computing device or devices can be located at a single installation site or distributed among different geographical locations. The computing environment 170 can include a plurality of computing devices that together embody a hosted computing resource, a grid computing resource, and/or other distributed computing arrangement. The computing environment 170 can also be embodied, in part, as functional logic elements (e.g., executed computer-readable instructions, logic circuitry, processing circuitry, etc.) executed or operated by the computing environment 170 to direct it to perform aspects of the embodiments described herein.

The client device 130 can be a client of the computing environment 170. The client application 132 on the client device 130 can communicate data with the computing environment 170 over the network 150. As examples, the computing environment 170 can send delivery address data, package data, itinerary data, schedule data, next-destination route data, and other data to the client application 132. The client application 132 can also send user credentials, delivery confirmation data, images, GPS data, and other data to the computing environment 170.

As described in further detail below with reference to FIGS. 3A-3C and FIG. 4, the peripheral device 110 and the client device 130 are configured to promptly and secure establish a wireless data communications channel between them. The channel can be a short-range, low-power BLE channel in one example, but the concepts described herein can be extended to WiFi® channels, WiFi Direct channels, and other channels. The procedure to establish the channel can proceed relatively quickly and without user intervention. Once a channel is established between the peripheral device 110 and the client device 130, the devices can maintain an affinity to reestablish the channel with each over a predetermined period of time, such as until a driver of the vehicle 101 goes "off-schedule." This affinity permits faster reestablishment of the channel. The channel can also be reestablished at a further distance than the initial pairing, to facilitate less delay in the transfer of data.

The peripheral device 110 and the client device 130 are also configured to communicate relatively large amounts of data between each other in data chunks using the BLE or other channels. Each data chunk can be communicated and acknowledged between the client device 130 and the peripheral device 110, respectively, before another data chunk is communicated. The protocol facilitates two-way communication of relatively large amounts of data between the client device 130 and the peripheral device 110.

Figure 3A:
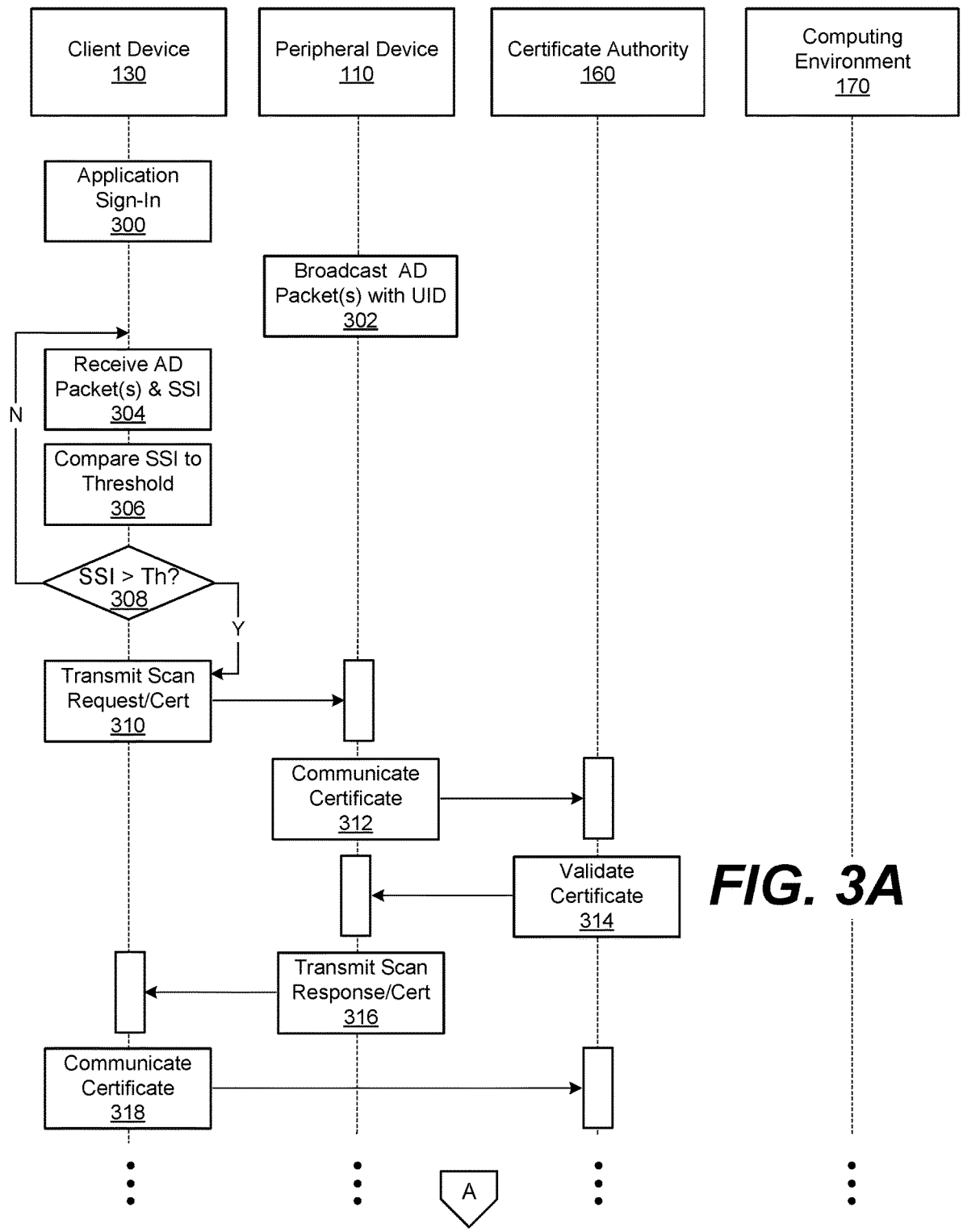
FIG. 3A illustrates a process for prompt and secure data communication pairing performed by devices in the networked environment shown in FIG. 2 according to various example embodiments described herein.
Figure 3B:
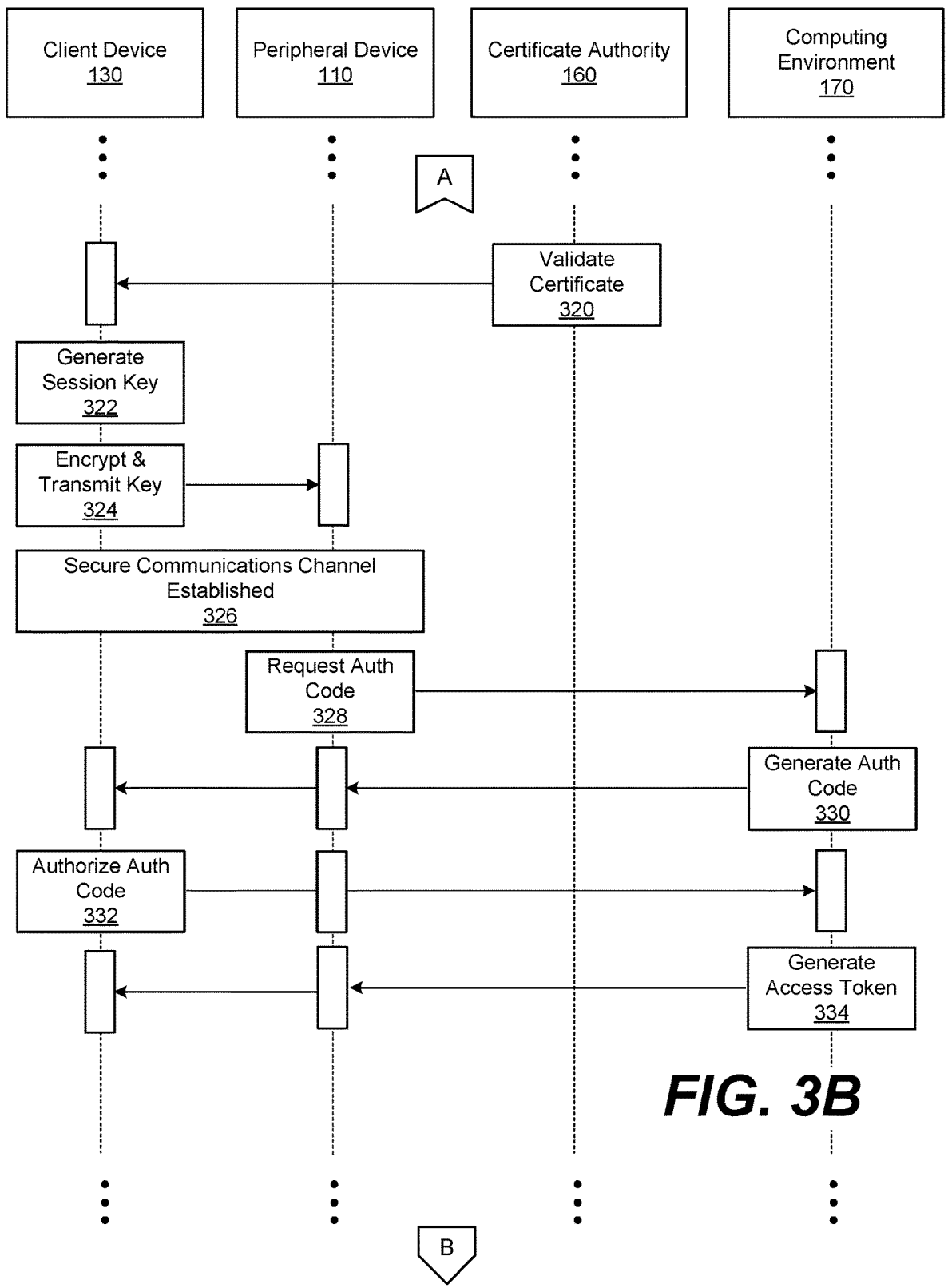
FIG. 3B further illustrates the process shown in FIG. 3A according to various example embodiments described herein.
Figure 3C:
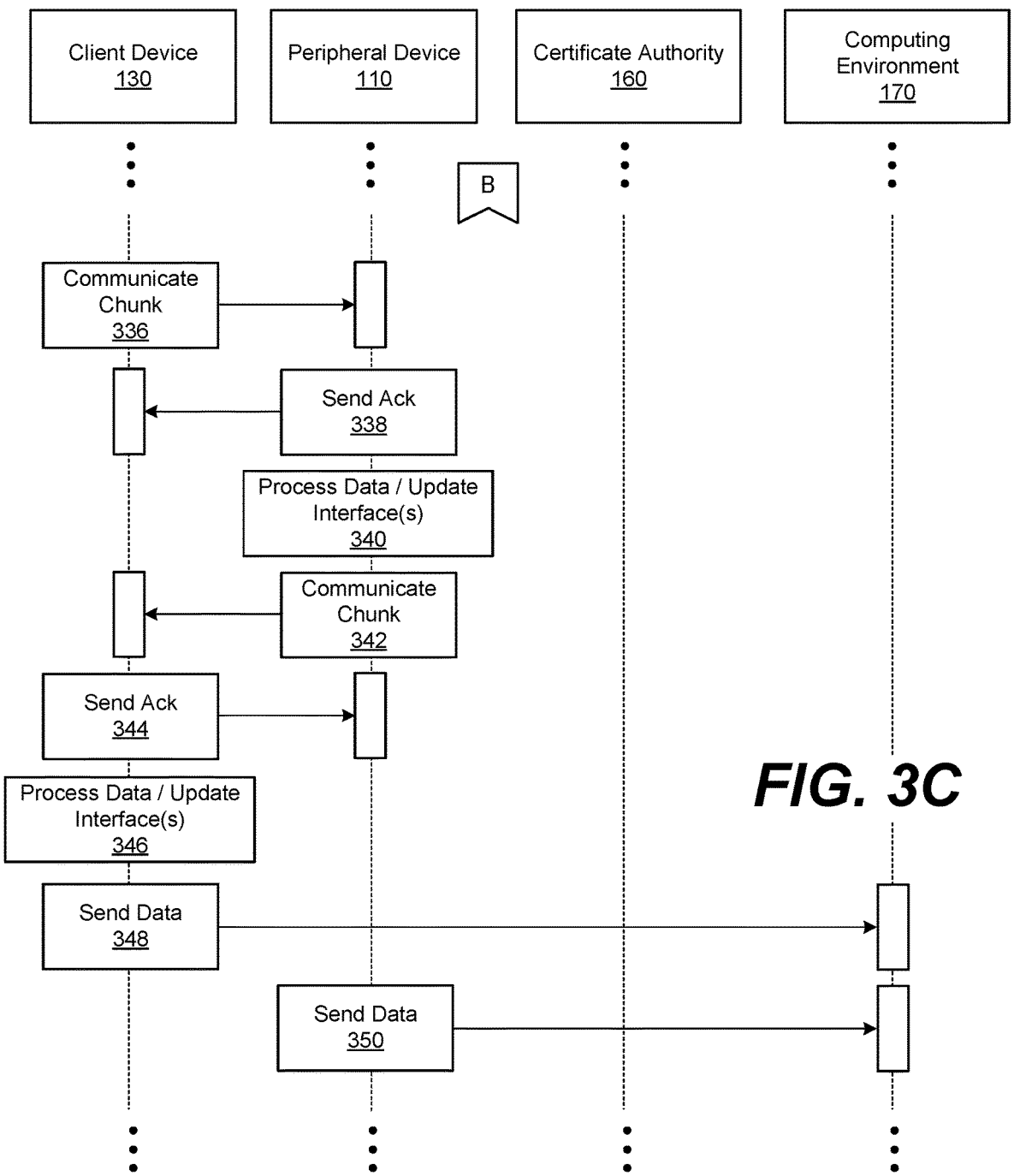
FIG. 3C further illustrates the process shown in FIGS. 3A and 3B according to various example embodiments described herein.

FIGS. 3A-3C illustrates a process for prompt and secure data communication pairing performed by devices in the environment 100 shown in FIG. 2 according to various example embodiments described herein. In certain aspects, the process flowchart in FIGS. 3A-3C can be viewed as depicting an example set of steps performed by the client device 130 and the peripheral device 110, among others. The flowchart in FIGS. 3A-3C provides merely one example of a functional sequence or arrangement of steps that can be employed to implement the aspects of fulfillment option optimization described herein. Further, although the process is described in connection with the environment 100, other computing environments, systems, and/or devices can perform the process.

At reference numeral 300 in FIG. 3A, the process includes authenticating or signing-in a user of the client application 132 on the client device 130. For example, a user of the client device 130 can enter username and password credentials at a login screen for the client application 132. The user may enter her or his credentials at the start of a new work shift or day. The client application 132 can confirm (or deny) the identity and authority of the user at reference numeral 300. If the identity of the user is confirmed, then the client application 132 can permit access to the features and functions of the client application 132 and proceed with the remaining processes shown in FIGS. 3A-3C and FIG. 4. If the identity of the user is not confirmed, then the client device 130 may stop or halt other process steps.

At reference numeral 302, the process includes the peripheral device 110 broadcasting an advertising packet to pair with another computing device. In one example, the advertising packet can be a wireless BLE advertising packet, but advertising packets for other protocols can be relied upon. For example, the concepts can be extended to WiFi® channels, WiFi Direct channels, and other channels.

The advertising packet can include a unique identifier (UID) of the peripheral device 110, a UID of the vehicle 101, or another suitable unique identifier. The UID can be stored in the data store 140 of the client device 130 for later reference as described below. The advertising packet is broadcast to any devices capable of wireless data communications with the peripheral device 110, such as the client devices 130 and 131 shown in FIG. 1, among others.

At reference numeral 304, the process includes the client device 130 wirelessly receiving the advertising packet from the peripheral device 110. To receive the advertising packet, it may be necessary for the client device 130 to be within a certain distance of the peripheral device 110, such as within 10 meters, 20 meters, or 30 meters, although low-power wireless communications links can be maintained over longer distances in some cases.

The advertising packet is received along with a signal strength indicator (SSI). The SSI can be provided by the wireless network interface of the client device 130, when the advertising packet is received. The SSI is an indicator of the power present in the radio signal through which the advertising packet was communicated. The SSI will vary based on the proximity of the client device 130 to the peripheral device 110, for example, among other factors, as the client device 130 is physically repositioned over time.

At reference numeral 306, the process includes the client device 130 comparing the SSI to a predetermined threshold. The predetermined threshold can be configured or determined empirically, for example, or calculated. The predetermined threshold can be set in relation to proximity or distance. Thus, if the SSI is greater than or equal to the predetermined threshold, the client device 130 may be within a certain distance or proximity to the peripheral device 110 and the vehicle 101. As examples, the predetermined threshold can be set to identify an SSI associated with a distance of less than 3 meters, 2 meters, or 1 meter, although other distances can be accounted for. In this step, the client device 130 seeks to identify a relatively close proximity to the peripheral device 110, such as when a user of the client device 130 is seated within the vehicle 101.

If the SSI is less than the predetermined threshold, then the process proceeds back to the start, and the client device 130 continues to monitor for advertising packets broadcast by peripheral devices in the vehicles 101-104, among others. On the other hand, if the SSI is greater than or equal to the predetermined threshold, then the process proceeds to reference numeral 310 to initiate pairing with the peripheral device 110.

At reference numeral 310, the process includes the client device 130 transmitting a scan request to the peripheral device 110 to start the pairing process. In one example, the scan request can include a client certificate of the client device 130. The client certificate can be used to validate the identity of the client device 130 and ultimately establish a secure communications channel between the client device 130 and the peripheral device 110. The client certificate includes the public key of the client device 130, which can be used to establish secure communications as described below. In other cases, the scan request can be transmitted without a client certificate from the client device 130 if encrypted communications are not needed.

At reference numeral 312, the process includes the peripheral device 110 communicating with the certificate authority 160 over the network 150. The certificate authority 160 can validate the client certificate, or aspects of the client certificate, at reference numeral 314, unless the certificate is expired, revoked, or otherwise improper or ineffective. Reference numerals 312 and 314 can be omitted in some cases, such as if a client certificate is not received from the client device 130 in the scan request. In another scenario, the peripheral device 110 can examine the chain of trust associated with the client certificate received from the client device 130. For example, if the peripheral device 110 can confirm the root certificate authority in the client certificate, then the process can proceed without communications with the certificate authority 160.

Assuming the client certificate is validated by the peripheral device 110 or the certificate authority 160, the process includes the peripheral device 110 wirelessly transmitting a scan response to the client device 130 at reference numeral 316. In one example, the scan response can include a peripheral certificate of the peripheral device 110. The peripheral certificate can be used to validate the identity of the peripheral device 110 and establish a secure communications channel. The peripheral certificate includes the public key of the peripheral device 110, which can be used to establish secure communications as described below. In other cases, the scan response can be transmitted without a peripheral certificate from the peripheral device 110.

At reference numeral 318, the process includes the client device 130 communicating with the certificate authority 160 over the network 150. Referring to FIG. 3B, the certificate authority 160 can validate the peripheral certificate, or aspects of the peripheral certificate, at reference numeral 320, unless the certificate is expired, revoked, or otherwise improper or ineffective. Reference numerals 318 and 320 can be omitted in some cases, such as if a peripheral certificate is not received from the peripheral device 110 in the scan response. In another scenario, the client device 130 can examine the chain of trust associated with the peripheral certificate received from the peripheral device 110. For example, if the client device 130 can confirm the root certificate authority in the peripheral certificate, then the process can proceed without communications with the certificate authority 160.

At reference numeral 322, the process includes the client device 130 generating a session key. Among others, the session key can be an symmetric key, such as an AES, AES-128, AES-192, or AES-256 key. In other examples, the session key can be an RC4, DES, RC5, RC6, or another symmetric key. The symmetric key can be relied upon by the client device 130 and the peripheral device 110 to encrypt communications between them. In some cases, the generation of the session key can be omitted if encrypted communications are not needed.

At reference numeral 324, the process includes the client device 130 encrypting the session key with the public key of the client device 130. The process also includes the client device 130 transmitting the encrypted session key to the peripheral device 110 over the short-range wireless communications channel between them. At this point in the process, the client device 130 and the peripheral device 110 have completed the steps necessary to establish a secure wireless communications channel between them at reference numeral 326. Examples of these communications are described in further detail below.

The client device 130 and the peripheral device 110 can also exchange or agree upon a session parameter as a test for reestablishing communications between them, in case the wireless communications channel is lost. The session parameter can be any type of data parameter, such as a unique identifier generated by one of the devices, a hardware identifier of one of the devices, a media access control identifier of a network interface of the devices, or any other data known and agreed-upon by the devices.

In some cases, the client device 130 must be provisioned as a device that is authorized to access data, applications, and interfaces on the peripheral device 110 before it can interface with the IVIS 114 and other applications executing on the peripheral device 110. For example, the computing environment 170 may maintain a database of devices that are authorized to access the IVIS 114, data in the data store 120, or other features of the peripheral device 110.

To provision the client device 130, the process can include the peripheral device 110 requesting an authorization code from the computing environment 170 over the network 150 at reference numeral 328. In return, the computing environment 170 can generate and transmit an authorization code over the network 150 to the peripheral device 110 at reference numeral 330. The peripheral device 110 can also relay the authorization code to the client device 130 at reference numeral 330. The authorization code can be relayed over the secure wireless communications channel between the peripheral device 110 and the client device 130.

At reference numeral 332, the client device 130 can authorize the authorization code and transmit the authorization code back to the peripheral device 110 over the secure wireless communications channel between them. The client device 130 can also return a unique identifier of the client device 130, such as a hardware identifier, a network interface media access control identifier, or another identifier, back to the peripheral device 110 at reference numeral 332. The peripheral device 110 can also, upon receipt of the authorized authorization code, send a request to the computing environment 170 over the network 150 for registration of the client device 130. The request to register the client device 130 can include the unique identifier of the client device 130. Alternatively, the client device 130 can transmit the authorization code and unique identifier of the client device 130 back to the computing environment 170, directly, as the request to register.

At reference numeral 334, the process includes the computing environment 170 registering the client device 130 for access to services using the unique identifier of the client device 130. The process also includes the computing environment 170 generating an access token to permit access to applications and services on the peripheral device 110 by the client device 130. The computing environment 170 can send the access token to the peripheral device 110 over the network 150. The peripheral device 110 can relay the access token to the client device 130 in some cases, if needed.

FIG. 3C illustrates secure communications between the client device 130 and the peripheral device 110. The communications can occur over a wireless BLE channel in one example, but the concepts described herein can be extended to WiFi® channels, WiFi Direct channels, and other channels. The communications can proceed using BLE Generic Attribute Profile (GATT) services and characteristics in one example. The GATT is built on the BLE Attribute Protocol (ATT) and establishes common operations and frameworks for data transported and stored by the Attribute Protocol. Example GATT service and characteristic profiles that can be used include receive, receive acknowledgement, send, and send acknowledgement. The client application 132 on the client device 130 can interface with an application executing on the peripheral device 110, including the IVIS 114, using these or other GATT profiles, although other profiles and protocols can be relied upon.

At reference numeral 336, the process includes the client device 130 communicating a data chunk to the peripheral device 110 over the wireless communications link between them. The GATT service and characteristic profiles can be used for this communication, although other techniques can be relied upon. The data chunk can be a subset among a larger data group. Multiple data chunks can be sent, in turn, and each data chunk can be identified by a sequence offset to maintain the structure of the larger data group. The data chunk can include any type of data, including delivery address data, package data, itinerary data, schedule data, next-destination route data, and other data related to tasks being undertaken by the driver of the vehicle 101. The communication of data in data chunks can be helpful, for example, when communicating data over short-range, low-power wireless channels, such as BLE wireless channels.

The data chunk can also be encrypted using the session key generated at reference numeral 322 in FIG. 3B, as the data can be business-sensitive or other private data. In other cases, the data chunk can be communicated without data encryption. The communications stack 112 of the peripheral device 110 can also receive the data chunk over the wireless communications link at reference numeral 336 and decrypt it using the session key, if necessary.

At reference numeral 338, the process includes the peripheral device 110 sending an acknowledgment of receipt of the data chunk sent at reference numeral 336. The GATT profiles can be used for this communication, although other techniques can be relied upon. The acknowledgment can include a sequence offset associated with the data chunk. Because multiple data chunks can be sent by the client device 130, in turn, the sequence offset can be used to confirm receipt of a certain data chunk. The acknowledgment can also be encrypted by the session key in some cases, although it is not necessary to encrypt the acknowledgment in all cases. The steps at reference numerals 336 and 338 can repeatedly occur over time depending upon how much data is being communicated.

In other cases, data can be communicated between the client device 130 and the peripheral device 110 at reference numerals 336 and 338 without segmenting or dividing the data into data chunks and without using acknowledgments. For example, if a WiFi Direct wireless channel is established between the client device 130 and the peripheral device 110, reference numeral 336 can include communicating larger amounts of data, without data chunks, and the acknowledgment at reference numeral 338 can be omitted.

At reference numeral 340, the process includes the peripheral device 110 processing the data received from the client device 130. For example, the peripheral device 110 can store the data in the data store 120. The IVIS 114 can also process the data and take additional actions. For example, the IVIS 114 can process delivery address data, package data, itinerary data, schedule data, next-destination route data. One or more applications executing on the peripheral device can also present updated user interfaces on the peripheral device 110 for the driver of the vehicle 101 based on the data.

At reference numeral 342, the process includes the peripheral device 110 communicating a data chunk to the client device 130 over the wireless communications link between them. The GATT profiles can be used for this communication, although other techniques can be relied upon. The data chunk can be a subset among a larger data group. Multiple data chunks can be sent, in turn, and each data chunk can be identified by a sequence offset to maintain the structure of the larger data group. The data chunk can include any type of data, including vehicle sensor data (e.g., from seatbelt sensors, speed sensors, location data, camera data, radar data, etc.), vehicle telemetry data (e.g., speed, direction, and other data), and other data.

The data chunk can also be encrypted using the session key generated at reference numeral 322 in FIG. 3B, as the data can be business-sensitive data. In other cases, the data chunk can be communicated without data encryption. The client device 130 can also receive the data chunk over the wireless communications link at reference numeral 342 and decrypt it using the session key, if necessary.

At reference numeral 344, the process includes the client device 130 sending an acknowledgment of receipt of the data chunk sent at reference numeral 342. The acknowledgment can include a sequence offset associated with the data chunk. Because multiple data chunks can be sent by the peripheral device 110, in turn, the sequence offset can be used to confirm receipt of a certain data chunk. The acknowledgment can also be encrypted by the session key in some cases, although it is not necessary to encrypt the acknowledgment in all cases. The steps at reference numerals 342 and 344 can repeatedly occur at any interval over time depending upon how much data is being communicated.

At reference numeral 346, the process includes the client device 130 processing the data received from the peripheral device 110. For example, the client device 130 can store the data in the data store 140. The client application 132 can also process the data and take additional actions. For example, client application 132 can process vehicle sensor data, vehicle telemetry data, and other data and present updated user interfaces on the client device 130.

At reference numeral 348, the process includes the client device 130 sending data to the computing environment 170 over the network 150. For example, the client device 130 can send vehicle sensor data, vehicle telemetry data, and other data to the computing environment 170 for data aggregation and analysis. The computing environment 170 can also use the data for business metrics, to place calls for assistance (e.g., SOS calls), and for other purposes.

At reference numeral 350, the process includes the peripheral device 110 sending data to the computing environment 170 over the network 150. For example, the peripheral device 110 can send delivery confirmation data, images, GPS data, and other data to the computing environment 170 for data aggregation and analysis. The computing environment 170 can also use the data for business metrics and for other purposes. In some cases, the peripheral device 110 can also send data received from the client device 130 to the computing environment 170 over the network 150. The processes performed at reference numerals 336, 338, 340, 342, 344 346, 348, and 350 can be performed in any order and repeatedly over time.

Figure 4:
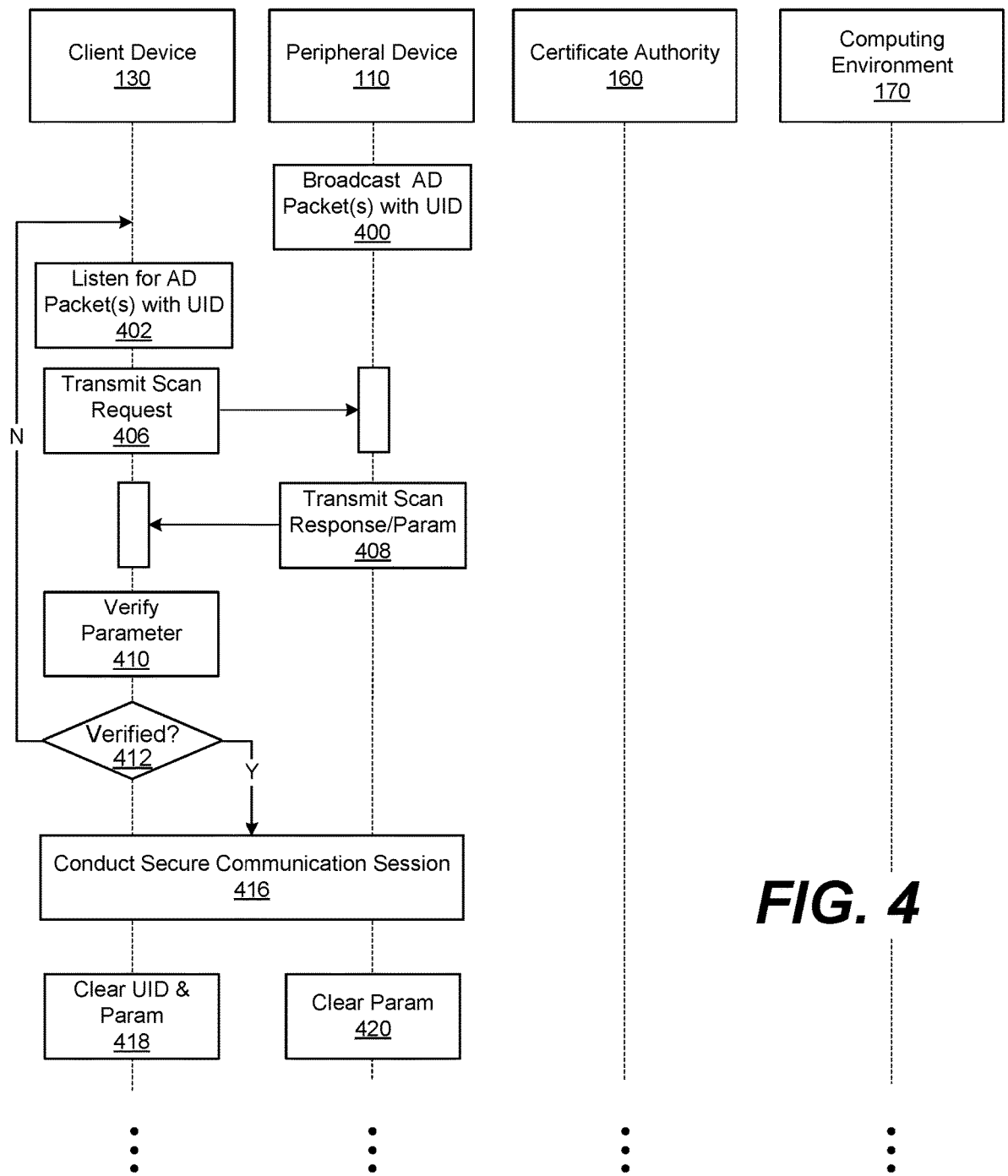
FIG. 4 illustrates a process for reestablishing a data communications channel by devices in the networked environment shown in FIG. 2 according to various example embodiments described herein.

FIG. 4 illustrates a process for reestablishing a data communications channel according to various example embodiments described herein. The steps performed in FIG. 4 can be conducted if the wireless communications channel between the client device 130 and the peripheral device 110 is lost or disconnected. This can occur, for example, if the driver of the vehicle 101 exits to deliver a package, and the client device 130 is physically separated from the peripheral device 110 by a distance too far to maintain a wireless BLE channel. It is assumed, however, that the client device 130 and the peripheral device 110 have exchanged unique identifiers, a session key, a session parameter at the outset in FIG. 4.

At reference numeral 400, the process includes the peripheral device 110 broadcasting an advertising packet to pair with the client device 130. The advertising packet can include the UID of the peripheral device 110. The UID is the same as that communicated at reference numeral 302 in FIG. 3A.

At reference numeral 402, the process includes the client device 130 listening for and wirelessly receiving the advertising packet from the peripheral device 110. To receive the advertising packet, it may be necessary for the client device 130 to be within a certain range or distance of the peripheral device 110.

The advertising packet is received along with an SSI. However, the SSI is not used in the same way as described above with reference to FIG. 3A. Instead, the client device 130 will listen for and attempt communications as soon as it can identify a broadcast of the UID of the peripheral device 110, even if the SSI is low or very low.

At reference numeral 406, the process includes the client device 130 transmitting a scan request to the peripheral device 110. Here, it is not necessary for the client device 130 to transmit the scan request along with the client certificate of the client device 130, because the client certificate was already exchanged.

At reference numeral 408, the process includes the peripheral device 110 wirelessly transmitting a scan response to the client device 130. It is not necessary for the peripheral device 110 to transmit the scan response along with the peripheral certificate of the peripheral device 110, because the peripheral certificate was already exchanged.

However, the scan response can include a session parameter that was previously agreed-upon between the client device 130 and the peripheral device 110. The session parameter can be any type of data parameter, such as a unique identifier generated by one of the devices, a hardware identifier of one of the devices, a media access control identifier of a network interface of the devices, or any other data known and agreed-upon by the devices. The session parameter can be encrypted using the session key generated at reference numeral 322 in FIG. 3B.

At reference numeral 410, the process can include the client device 130 verifying the session parameter received from the peripheral device 110. The client device 130 can decrypt the session parameter using the session key. If the session parameter is found to match with the agreed-upon session parameter expected by the client device at reference numeral 412, then the process can proceed to reference numeral 416. Otherwise, if the session parameter does not match, then the process can proceed back to listening for broadcast packets.

At reference numeral 412, the process can include the client device 130 and the peripheral device 110 conducting a secure communications session, similar to that shown in FIG. 3C and described above. Notably, it is not necessary for the client device 130 and the peripheral device 110 to validate certificates in FIG. 4. Also, it is not necessary for the client device 130 to compare the SSI associated with the broadcast advertising packet from the peripheral device 110 with a threshold, as in reference numerals 306 and 308 in FIG. 3A. Thus, reestablishing the secure communications session can occur faster, and at a greater physical separation between the devices, as in the initial pairing shown in FIG. 3A. By storing and referencing the UID of the peripheral device, the session key, and the session parameter, the client device 130 and the peripheral device 110 can maintain an affinity to each other for reestablishing wireless communications.

At some time, the client device 130 and the peripheral device 110 can forget or dismiss the affinity for reestablishing wireless communications with each other. For example, at reference numeral 418, the client device 130 can clear or delete the UID of the peripheral device 110 from the data store 140. The client device 130 can also clear or delete the session parameter from the data store 140. These actions can be taken at the end of a work shift of a driver of the vehicle 101, when the driver goes "off-schedule," or at any other suitable time. After the devices have forgotten the affinity for communications with each other, the client device 130 will again compare the SSI of advertising packets received from other peripheral devices to a threshold. The client device 130 can then establish new pairings with other vehicles, including the vehicles 102-104, at another time or day, based on proximity.

Further, at reference numeral 420, the peripheral device 110 can clear or delete data received from or shared with the client device 130. For example, the peripheral device 110 can delete the session parameter shared with the client device 130, the access token of the client device 130, credentials of the client device 130, and other data from the data store 120. These actions can be taken at any suitable time, such as when the peripheral device 110 receives a scan request from and establishes communications with another client device.

Figure 5:
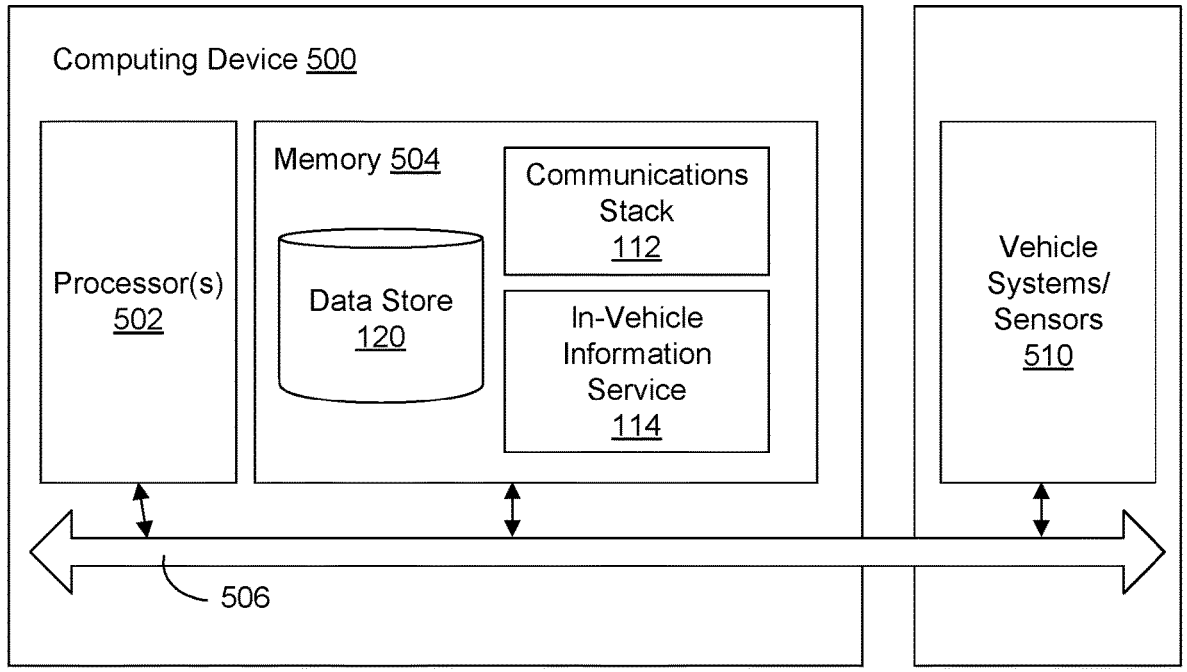
FIG. 5 illustrates an example schematic block diagram of a computing device shown in FIG. 2 according to various embodiments described herein.

FIG. 5 illustrates an example schematic block diagram of a computing device 500 to implement the peripheral device 110 shown in FIG. 2 according to various embodiments described herein. The computing device 500 includes at least one processing system, for example, having a processor 502 and a memory 504, both of which are electrically and communicatively coupled to a local interface 506. The local interface 506 can be embodied as a data bus with an accompanying address/control bus or other addressing, control, and/or command lines.

In part, the local interface 506 can be embodied as an in-vehicle interface, such as the on ODB bus, the CAN bus, the LIN bus, the MOST bus, ethernet, or other network interfaces using any suitable protocols. The local interface 506 can be communicatively coupled to the in-vehicle systems and sensors 510 of the vehicle 101. The in-vehicle systems and sensors 510 can include controls, seatbelt sensors, speed sensors, GPS systems, telemetry systems, camera systems, LIDAR systems, radar systems, and related systems in automobiles.

In various embodiments, the memory 504 stores data and software or executable-code components executable by the processor 502. For example, the memory 504 can store executable-code components associated with the communications stack 112 and/or the IVIS 114 for execution by the processor 502. The memory 504 can also store data such as that stored in the data store 120, among other data.

The memory 504 can store other executable-code components for execution by the processor 502. For example, an operating system can be stored in the memory 504 for execution by the processor 502. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 504 stores software for execution by the processor 502. In this respect, the terms "executable" or "for execution" refer to software forms that can ultimately be run or executed by the processor 502, whether in source, object, machine, or other form. Examples of executable programs include, for example, a compiled program that can be translated into a machine code format and loaded into a random access portion of the memory 504 and executed by the processor 502, source code that can be expressed in an object code format and loaded into a random access portion of the memory 504 and executed by the processor 502, or source code that can be interpreted by another executable program to generate instructions in a random access portion of the memory 504 and executed by the processor 502, etc.

Figure 6:
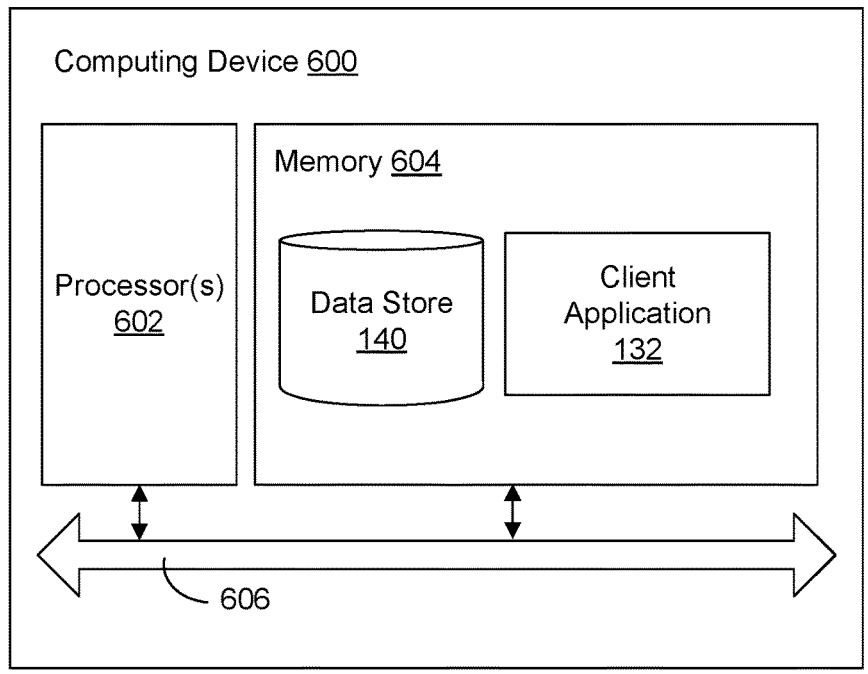
FIG. 6 illustrates an example schematic block diagram of another computing device shown in FIG. 2 according to various embodiments described herein.

FIG. 6 illustrates an example schematic block diagram of a computing device 600 to implement the client device 130 shown in FIG. 2 according to various embodiments described herein. The computing device 600 includes at least one processing system, for example, having a processor 602 and a memory 604, both of which are electrically and communicatively coupled to a local interface 606. The local interface 606 can be embodied as a data bus with an accompanying address/control bus or other addressing, control, and/or command lines.

In various embodiments, the memory 604 stores data and software or executable-code components executable by the processor 602. For example, the memory 604 can store executable-code components associated with the client application 132 for execution by the processor 602. The memory 604 can also store data such as that stored in the data store 140, among other data.

The memory 604 can store other executable-code components for execution by the processor 602. For example, an operating system can be stored in the memory 504 for execution by the processor 502. Where any component discussed herein is implemented in the form of software, any one of a number of programming languages can be employed such as, for example, C, C++, C#, Objective C, JAVA®, JAVASCRIPT®, Perl, PHP, VISUAL BASIC®, PYTHON®, RUBY, FLASH®, or other programming languages.

In various embodiments, the memory 604 stores software for execution by the processor 602. In this respect, the terms "executable" or "for execution" refer to software forms that can ultimately be run or executed by the processor 602, whether in source, object, machine, or other form. Examples of executable programs include, for example, a compiled program that can be translated into a machine code format and loaded into a random access portion of the memory 604 and executed by the processor 602, source code that can be expressed in an object code format and loaded into a random access portion of the memory 604 and executed by the processor 602, or source code that can be interpreted by another executable program to generate instructions in a random access portion of the memory 604 and executed by the processor 602, etc.

Referring among FIGS. 5 and 6, an executable program can be stored in any portion or component of the memory 504 and the memory 604 including, for example, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or other types of memory devices.

In various embodiments, the memory 504 and the memory 604 can each include both volatile and nonvolatile memory and data storage components. Volatile components are those that do not retain data values upon loss of power. Nonvolatile components are those that retain data upon a loss of power. Thus, memory 504 and the memory 604 can include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device.

As discussed above, the communications stack 112, the IVIS 114, and the client application 132 can each be embodied, at least in part, by software or executable-code components for execution by general purpose hardware. Alternatively the same can be embodied in dedicated hardware or a combination of software, general, specific, and/or dedicated purpose hardware. If embodied in such hardware, each can be implemented as a circuit or state machine, for example, that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart or process diagrams shown in FIGS. 3A-3C and FIG. 4 are representative of certain processes, functionality, and operations of the embodiments discussed herein. Each block can represent one or a combination of steps or executions in a process. Alternatively or additionally, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as the processor 702. The machine code can be converted from the source code, etc. Further, each block can represent, or be connected with, a circuit or a number of interconnected circuits to implement a certain logical function or process step.

Although the flowchart or process diagrams shown in FIGS. 3A-3C and FIG. 4 illustrates a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Also, any logic or application described herein, including the communications stack 112, the IVIS 114, and the client application 132 can be embodied, at least in part, by software or executable-code components, can be embodied or stored in any tangible or non-transitory computer-readable medium or device for execution by an instruction execution system such as a general purpose processor. In this sense, the logic can be embodied as, for example, software or executable-code components that can be fetched from the computer-readable medium and executed by the instruction execution system. Thus, the instruction execution system can be directed by execution of the instructions to perform certain processes such as those illustrated in FIGS. 3A-3C and FIG. 4. In the context of the present disclosure, a non-transitory computer-readable medium can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium can include a RAM including, for example, an SRAM, DRAM, or MRAM. In addition, the computer-readable medium can include a ROM, a PROM, an EPROM, an EEPROM, or other similar memory device.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the Therefore, at least the following is claimed:

1. A method to establish data communications, comprising:
broadcasting an advertising packet by a peripheral device;
receiving the advertising packet and a signal strength indicator for the advertising packet by a client device;
comparing the signal strength indicator to a threshold by the client device;
transmitting, by the client device, a scan request to the peripheral device based on the comparing, the scan request including a client certificate;
validating, by the peripheral device, the client certificate;
transmitting, by the peripheral device, a scan response to the client device based on validation of the client certificate, the scan response comprising a peripheral certificate;
validating, by the client device, the peripheral certificate;
generating, by the client device, a session key based on validation of the peripheral certificate and transmitting the session key to the peripheral device;
communicating a data chunk among the client device and the peripheral device through a secure communications channel based on the session key; and
acknowledging the data chunk as being communicated among the client device and the peripheral device.

2. The method to establish data communications of claim 1, wherein comparing the signal strength indicator to the threshold comprises determining whether the client device is within a predetermined proximity to the peripheral device.

3. The method to establish data communications of claim 2, wherein transmitting the scan request comprises transmitting the scan request to the peripheral device in response to the client device being within the predetermined proximity to the peripheral device.

4. The method to establish data communications of claim 1, wherein communicating the data chunk among the client device and the peripheral device comprises communicating the data chunk over a secure Bluetooth low energy (BLE) communications channel based on the session key.

5. A method for data communications, comprising:
receiving an advertising packet from a peripheral device;
comparing a signal strength indicator for the advertising packet to a threshold;
transmitting a scan request to the peripheral device, the scan request including a client certificate;
generating a session key based on the comparing and transmitting the session key to the peripheral device;
communicating a data chunk to the peripheral device through a secure communications channel based on the session key; and
receiving an acknowledgment from the peripheral device that the data chunk was received by the peripheral device.

6. The method for data communications of claim 5, wherein the advertising packet comprises a unique identifier of the peripheral device and the method further comprises:
storing the unique identifier as a reference for an affinity with the peripheral device; and
after communicating the data chunk, listening for an additional advertising packet from the peripheral device comprising the unique identifier.

7. The method for data communications of claim 6, further comprising:
confirming receipt of the additional advertising packet comprising the unique identifier from the peripheral device;
in response to receipt of the unique identifier, transmitting a scan request to the peripheral device; and
receiving a scan response from the peripheral device, the scan response including a session parameter.

8. The method for data communications of claim 7, further comprising:
verifying the session parameter; and
communicating another data chunk to the peripheral device through the secure communications channel based on verification of the session parameter.

9. The method for data communications of claim 8, further comprising:
clearing the unique identifier of the peripheral device and the session parameter to release the affinity with the peripheral device.

10. The method for data communications of claim 5, further comprising:
before generating the session key, receiving a scan response from the peripheral device, the scan response comprising a peripheral certificate; and
validating the peripheral certificate with a certificate authority.

11. The method for data communications of claim 5, further comprising:
encrypting the session key with a public key of the peripheral device to form an encrypted session key, wherein transmitting the session key to the peripheral device comprises transmitting the encrypted session key to the peripheral device.

12. The method for data communications of claim 5, further comprising:
receiving a second data chunk from the peripheral device through the secure communications channel;
decrypting the second data chunk with a private key to obtain data from the second data chunk; and
generating an acknowledgment that the second data chunk was received by the peripheral device, the acknowledgment comprising a sequence offset associated with the second data chunk.

13. The method for data communications of claim 5, wherein comparing the signal strength indicator to the threshold comprises determining a distance to the peripheral device.

14. The method for data communications of claim 13, wherein transmitting the session key to the peripheral device comprises transmitting the session key in response to the distance being less than a predetermined distance.

15. The method for data communications of claim 5, wherein communicating the data chunk to the peripheral device comprises communicating the data chunk over a secure Bluetooth low energy (BLE) communications channel based on the session key.

16. A computing device, comprising:
a memory device to store computer-readable instructions thereon; and
at least one processing device configured through execution of the computer-readable instructions to:
receive an advertising packet from a peripheral device;
compare a signal strength indicator for the advertising packet to a threshold;
generate a session key in response to the signal strength indicator being greater than or equal to the threshold;
transmit the session key to the peripheral device;

receive an encrypted data chunk from the peripheral device;

decrypt a data chunk from the encrypted data chunk using the session key; and send an acknowledgment to the peripheral device that the data chunk was received.

17. The computing device of claim 16, wherein the advertising packet comprises a unique identifier of the peripheral device and the at least one processing device is further configured to:

store the unique identifier as a reference for an affinity with the peripheral device; and listen for an additional advertising packet from the peripheral device comprising the unique identifier.

18. The computing device of claim 17, wherein the at least one processing device is further configured to:

confirm receipt of the additional advertising packet comprising the unique identifier from the peripheral device;

in response to receipt of the unique identifier, transmit a scan request to the peripheral device; and receive a scan response from the peripheral device, the scan response including a session parameter.

19. The computing device of claim 18, wherein the at least one processing device is further configured to:

verify the session parameter;

generate a second encrypted data chunk using the session key based on verification of the session parameter; and transmit the second encrypted data chunk to the peripheral device.

20. The computing device of claim 19, wherein the at least one processing device is further configured to clear the unique identifier of the peripheral device and the session parameter to release an affinity with the peripheral device.

21. The computing device of claim 16, wherein the at least one processing device is further configured to compare the signal strength indicator to the threshold to determine a distance to the peripheral device.

* * * * *